May 13, 1969      R. G. MOORE      3,443,659
GAS CUSHION VEHICLE WITH ATTITUDE STABILIZING MEANS
Filed March 3, 1967      Sheet 1 of 3
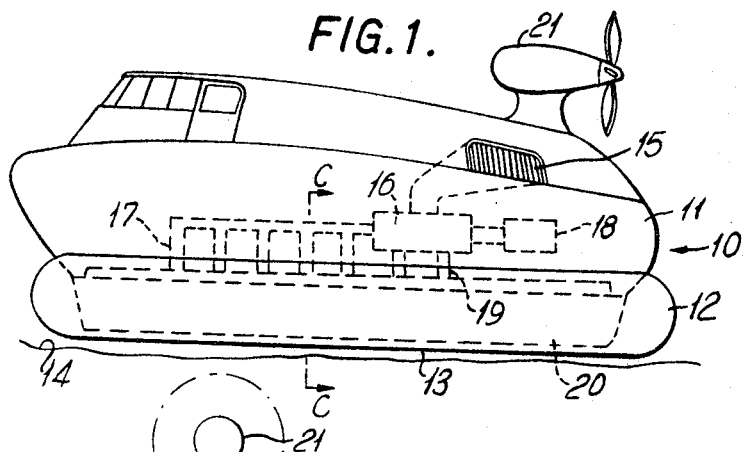
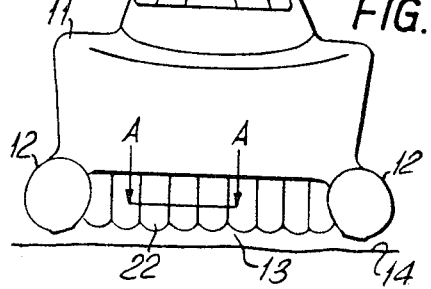
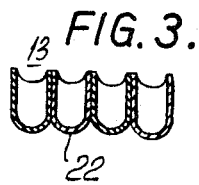
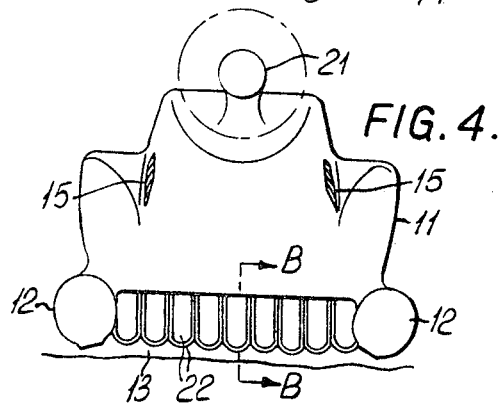
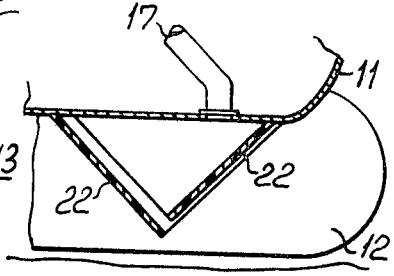
INVENTOR
R. G. MOORE
BY Cameron, Kerkam & Sutton
ATTORNEYS

United States Patent Office 3,443,659
Patented May 13, 1969

3,443,659
GAS CUSHION VEHICLE WITH ATTITUDE STABILIZING MEANS
Robert Granville Moore, Hythe, Southampton, England, assignor to Hovercraft Development Limited, London, England, a British company
Filed Mar. 3, 1967, Ser. No. 620,403
Claims priority, application Great Britain, Mar. 8, 1966, 10,119/66
Int. Cl. B60v 1/02, 1/12, 1/16
U.S. Cl. 180—118                                      7 Claims

ABSTRACT OF THE DISCLOSURE

When a gas cushion vehicle tilts from its normal operating attitude, gas in the gas cushion tends to flow from the lowered side of the vehicle to the raised side of the vehicle and to escape from under the raised side of the vehicle so that the attitude-stability of the vehicle is adversely affected.

Figure 6:
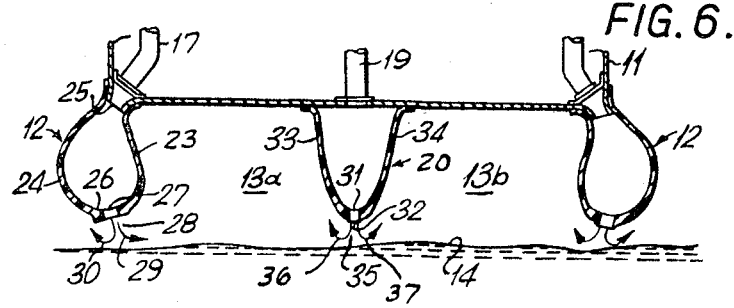

In accordance with the invention, when the vehicle tilts, a curtain of gas is directed from the vehicle body downwardly and towards the portion of the gas cushion beneath the lowered part of the vehicle to avoid the above tendency and to maintain or increase the cushion pressure beneath the lowered part of the vehicle to restore it to its normal attitude.

The present invention concerns gas cushion vehicles. A gas cushion vehicle comprises a body, and means for laterally containing a cushion of pressurised gas beneath the body. According to the operational requirements of the vehicle, the cushion containing means may be either rigid or flexible walls which depend downwardly from the body round the cushion of pressurised gas, or one or more curtains of fluid downwardly discharged from the vehicle, or any combination of rigid and flexible walls and fluid curtains. It will be appreciated that the vertical thickness of the cushion which can be contained by the cushion containing means is largely determined by the downward extent of the latter.

Generally speaking, in the normal cruising attitude of the vehicle relative to the surface beneath the vehicle, the degree of lateral containment of the gas cushion will be substantially equal at all points on the periphery of the cushion and the pressure of the cushion will accordingly be uniform in all parts. If the body of the vehicle should tilt relative to the surface, the degree of lateral containment of the cushion will improve in regions under the lowered parts of the vehicle body and deteriorate in regions under the raised parts of the body, since at the periphery of the regions under the lowered parts of the body, the cushion containing means will be more effective and at the periphery of the regions under the raised parts of the body, the cushion-containing means will be less effective. The immediate effect of the tilting of the body will therefore be to raise the pressure in regions of the cushion under the lowered parts of the body and to reduce the pressure in the regions of the cushion under the raised parts of the body; this non-uniform pressure distribution in the cushion provides forces tending to restore the body of the vehicle to its normal cruising attitude relative to the surface. However, gas then commences to flow from the high pressure regions of the cushion under the lowered parts of the body to the low pressure regions of the cushion under the raised parts of the body, and at the same time, gas begins to escape from the cushion in increased quantities from under the raised parts of the body where the cushion containing means is least effective thus augmenting the rate of flow of gas from the high pressure to the low pressure regions of the cushion. This flow of gas (termed a "cross-flow") from the regions under the lowered parts of the body to the regions under the raised parts of the body has the final effect of lowering the cushion pressure beneath the lowered parts of the body and of raising the pressure beneath the raised part of the body as the gas escaping from the periphery of regions beneath the raised parts of the body entrains gas from regions beneath the lowered parts of the body. Thus as the vehicle body tilts, the centre of pressure of the cushion shifts relative to the body momentarily to a position which increases the attitude-stability of the vehicle and then moves towards, and then beyond, the normal equilibrium position to a position which decreases the vehicle's attitude-stability. Furthermore, the normal supply of gas to the cushion must be augmented to replace the escaping gas and additional power must be available for the gas supplying equipment.

One known proposal to avoid cross-flow of gas in the cushion is to provide compartmenting means in the form of a compartmenting wall depending from the body within the cushion space for dividing the cushion into horizontally spaced portions. This compartmenting wall may take the form of an inflated structure of flexible material depending from the body, fed with pressurised gas and having a gas discharge nozzle or nozzles at its bottom. Gas is discharged downwardly from the compartmenting wall through the discharge nozzle in the form of a curtain serving to separate the cushion portions below the level of the nozzle in the compartmenting wall. It is intended that when the body of a vehicle having such a compartmenting wall tilts from the normal cruising attitude, the wall and the curtain of gas beneath the wall should prevent the cross-flow of gas from a portion of the cushion on one side of the wall where the cushion pressurie is increased to a portion of the cushion on the other side of the wall where the cushion pressure has fallen. Thus the higher pressure portion and the lower pressure portion should remain discrete and provide attitude-correcting forces on the body of the vehicle in proportion to the difference in their respective pressures.

It has been found that when the body of such a vehicle tilts from the normal attitude, the compartmenting wall is deflected by the increased pressure of one cushion portion towards the other cushion portion having the decreased pressure, and the nozzle tends to direct its curtain of gas into the reduced pressure portion of the cushion, causing the pressure therein to rise. This leads to a reduction in the attitude-correcting forces which act on the body, resulting from a reduction in the difference between the pressures in the horizontally spaced portions of the cushion. Furthermore the flow of curtain gas from the nozzle towards the lower pressure portion of the cushion can entrain gas from the higher pressure portion of the cushion and caused some cross-flow with its consequent disadvantages.

It is an object of this invention to provide a gas cushion vehicle having improved means for achieving attitude stability.

A gas cushion vehicle in accordance with the present invention comprises a body, means for laterally containing a cushion of pressurised gas beneath the body for supporting the vehicle, a nozzle member tiltably mounted beneath the vehicle body, the nozzle member having a port from which, in operation, a curtain of gas is downwardly directed into the vehicle supporting cushion whereby substantially to divide the cushion into two horizontally spaced cushion portions, and means responsive to differences in pressure between the cushion portions to cause the nozzle member so to tilt that the port will direct the curtain of gas towards whichever of the cushion portions has the higher pressure.

Since, in operation, the curtain of gas in directed towards the higher-pressure cushion portion, the pressure of the higher-pressure cushion portion tends to be maintained or increased. It will be appreciated therefore that if the vehicle tilts from its normal attitude, the pressure of the cushion portion on the lowered side of the vehicle will rise above the pressure of the cushion portion on the raised side of the vehicle and thereby provide attitude-correcting forces on the vehicle.

In one form, the pressure-responsive means may comprise a substantially air-impermeable wall which depends from the under-side of the vehicle body, at least part of the wall being deflectable in response to a pressure difference between the cushion-portions, and the nozzle member is mounted on the said deflectable part, there being constraining means which so constrain the nozzle member that the port will direct the curtain of gas towards the higher-pressure cushion portion when the wall is deflected.

The constraining means may comprise elongated members each of which is connected at one end to the nozzle member on one side of the port and at the other end to the body on the same side of the port. The elongated members may be cables or like flexible means. In cases where the means for laterally containing the vehicle supporting gas cushion is substantially rigid, the elongated members may be rigid links since the body will at all times be supported clear of the surface therebeneath and the elongated members will not then need to be capable of flexing when the vehicle is at rest on the surface.

The air impermeable wall may comprise two sheets of suitable flexible sheet material which are attached at their upper ends to the vehicle body on opposite sides of an aperture provided in the under-side of the body and at their lower ends to the nozzle member on corresponding opposite sides of the port whereby gas may be supplied between the two sheets from th said aperture to the port. The cables or like elongated members may be disposed between the two sheets.

The nozzle member may be formed from semi-rigid material such as the rubber and canvas composition from which tires are manufactured.

In another form, the nozzle member may be pivotably mounted beneath the vehicle body and operatively connected to driving means arranged for tilting the nozzle member in response to signals generated by the pressure-responsive means.

The pressure-responsive means may comprise flexible bellows exposed to each cushion portion and means for generating a signal in response to changes in the length of the bellows.

Figure 7:
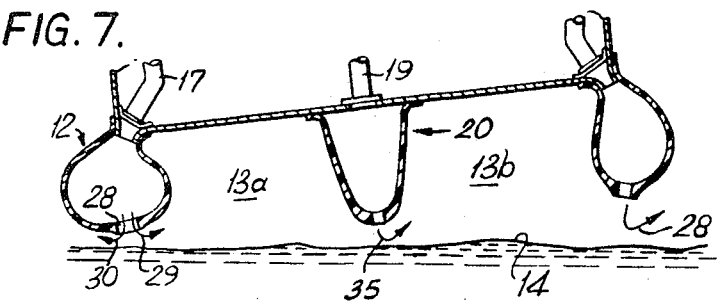
Figure 8:
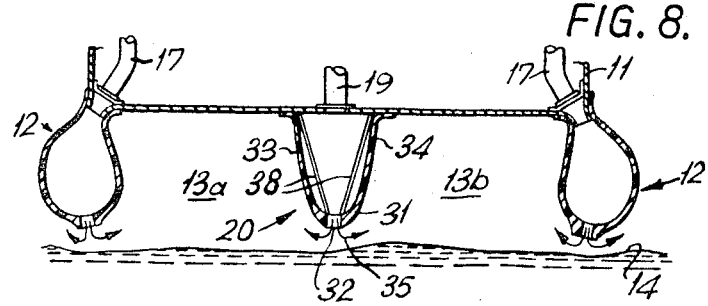
Figure 9:
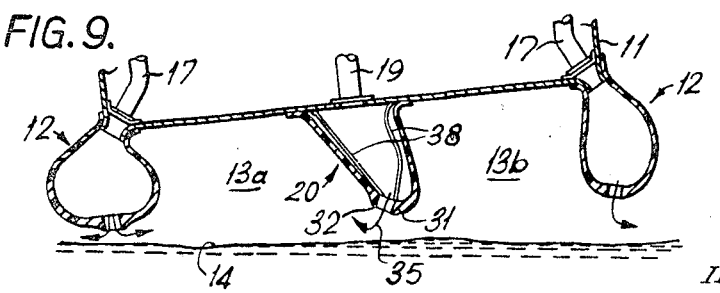
Figure 10:
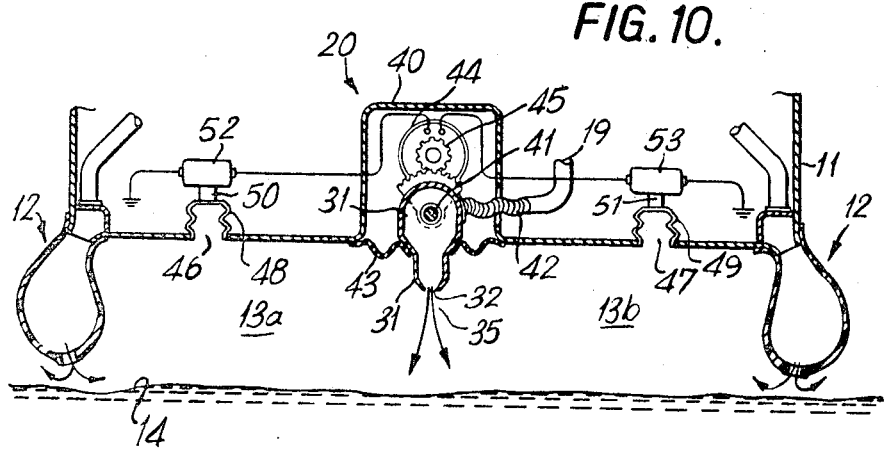
Figure 11:
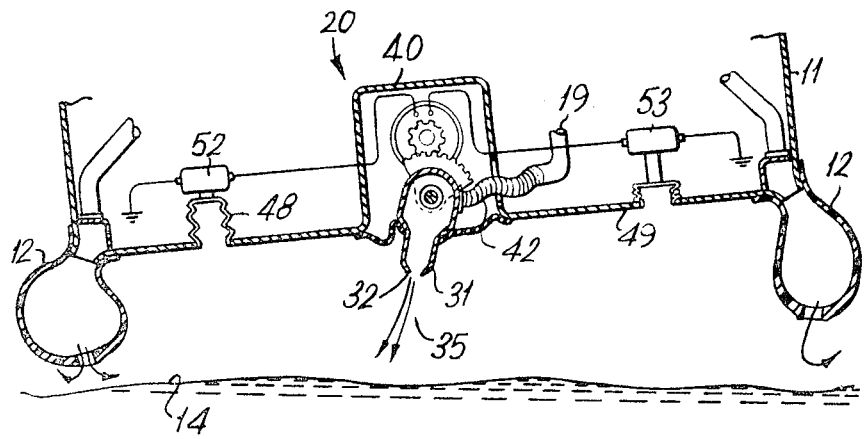

The invention will now be described by way of non-limitative example only, with reference to the accompanying drawings, in which:

FIGURE 1 is a side elevation of one form of a previously known gas-cushion vehicle, FIGURE 2 is a view of the front of the vehicle of FIGURE 1, FIGURE 3 is a cross-sectional plan view taken on the line A—A of FIGURE 2, FIGURE 4 is a rear view of the vehicle of FIGURE 1, FIGURE 5 is a cross-section side elevation taken on the line B—B of FIGURE 4, FIGURE 6 is a cross-sectional view taken on the line C—C of FIGURE 1, FIGURE 7 is a view similar to that of FIGURE 6 but with the body of the vehicle tilted, FIGURE 8 is a view corresponding to FIGURE 6 but showing part of a vehicle in accordance with the invention, FIGURE 9 shows the manner of action of the vehicle of FIGURE 8 when tilted, FIGURE 10 is a view similar to that of FIGURE 6 but showing part of another form of vehicle in accordance with the invention, and FIGURE 11 shows the manner of action of the vehicle of FIGURE 10 when tilted.

In the drawings a part which appears in more than one figure will be given the same reference numeral in each figure.

Referring first to FIGURE 1, there is shown a gas cushion vehicle 10 in operation having a body 11, a flexible side wall 12 attached to the body and defining and bounding the sides of a space 13 beneath the body 11 in which is formed and laterally contained a cushion of pressurised gas for supporting the body 11 above the ground surface 14. In this example the gas in the gas cushion is air which is induced at intakes 15 by a compressor 16, and fed to the cushion space by ducts 17. The compressor 16 is driven by a suitable motor 18. Some of the induced air from compressor 16 is passed to the cushion space via one or more ducts 19 (only one of which is depicted in FIGURE 1) leading to a compartmenting means 20, to be described below. The vehicle 10 is forwardly propelled by an air-screw unit 21.

In the front view of the vehicle 10, as shown in FIGURE 2, it will be seen that the front boundary of the space 13 is provided by a number of chute-like pieces of flexible material 22 which abut each other under the inflating action of the air cushion to prevent the forward escape of air from space 13.

The chute-like pieces 22 are shown in section in FIGURE 3. A fuller description of the chute-like pieces 22 will be found in copending application Ser. No. 566,948.

Referring now to FIGURES 4 and 5, the rear boundary of the space 13 is formed by two oppositely facing rows of pairs of chute-like pieces 22 similar to those shown in FIGURE 3. Each of the outermost pieces 22 is embraced by an inner chute-like piece 22 so as to form a bag, and pressurised air is supplied to the space between the inner and outermost chute-like pieces 22 from one of the ducts 17 so as to inflate the pieces 22 into abutment whereby to prevent the rearward escape of air from the cushion space 13. A description of a cushion-bounding wall comprising pairs of chute-like pieces 22 will be found in U.K. Patent No. 1,109,562.

In FIGURE 6, it will be seen that the flexible side wall structure 12 comprises an inner wall 23 and an outer wall 24 both of which are formed from flexible sheet material such as rubber or rubberised fabric, the walls 23, 24 being attached at their upper edges to the body 11 on each side of a port 25 terminating one of the ducts 17, and at their lower edges to each other by a number of spaced crossed-members 26 to define a port 27. The air supplied from duct 17 inflates the side wall structure 12 and is downwardly discharged from the port 27 in the form of a curtain 28. The configuration of the side wall structure 12 is arranged to be such that when the vehicle 10 is in its normal cruising attitude, the air curtain 28 is discharged somewhat inwardly towards the cushion space 13. A part 29 of the curtain 28 is deflected by the surface 14 into the cushion space 13 where it serves to form and maintain the air cushion therein, while any remainder 30 of the curtain 28 is outwardly bent by the pressure of the cushion.

The cushion space 13 is divided into two cushion portions 13a, 13b by a compartmenting wall 20, which is provided with a nozzle member 31 formed from hard rubber or a rubber and canvas composition as used for tires. The nozzle member 31 is provided with a port 32 which normally extends vertically. The nozzle member 31 is suspended from the vehicle body 11 by compartmenting membranes 33, 34 of air-impermeable flexible sheet material such as rubber or rubberised fabric attached to the body on opposite sides of a number of ducts 19. Pressurised air from the compressor 16 is supplied to the nozzle member 31 via the ducts 19 and the space between the membranes 33, 34, and is downwardly discharged from the nozzle member 31 in the form of an air curtain 35 substantially serving as a division between the cushion portions 13a, 13b, beneath the nozzle member. When the pressure in cushion portion 13a equals the pressure in cushion portion 13b, the air curtain 35 is discharged substantially vertically and divides into two substantially equal streams 36, 37 which enter the cushion portions 13a, 13b, and add to the air therein.

In FIGURE 7, the vehicle body 11 has tilted relative to the surface 14 from the normal attitude shown in FIGURE 6. The tilting could be caused by wind forces or by a shifting of the payload in the body 11 or by a change in the slope of surface 14. It will be noted that the left-hand side wall 12 is nearer the surface 14 (and may actually contact the surface 14) while the right-hand side wall 12 is further from the surface 14. The distance traversed by the air curtain 28 discharged from the left-hand side wall 12 is accordingly shorter and the curtain 28 is not substantially deflected outwardly by the pressure of gas in space 13. The part 29 of the curtain 28 is deflected by the surface 14 into the cushion space 13 and accounts for most of the air in the curtain, and the pressure of the air in the left-hand cushion portion 13a rises due to the more effective containment at its left-hand boundary and the increased quantity of air entering the left-hand margin of space 13. On the right-hand side of the space 13, the distance between the port 27 and the surface 14 has so increased that the curtain 28 is almost wholly bent outwardly from the cushion space 13 by the pressure of the air therein. The curtain 28 thus supplies less air to right-hand cushion portion 13b and has less containing effect, and the pressure of cushion portion 13b thus falls. The difference in pressure between the cushion portions 13a, 13b causes the compartmenting wall 20 to be deflected towards the lower pressure portion 13b, so that the port 32 in the nozzle member 31 directs the air curtain 35 mainly towards cushion portion 13b. The air curtain 35 is less effective in containing the high pressure cushion portion 13a and in addition, does not supply much (if any) air to cushion portion 13a to maintain its pressure. Air from cushion portion 13a is thus able to flow under the compartmenting wall 20 to the low pressure cushion portion 13b and thence under the right-hand side wall 12. The flow of air from portion 13a to portion 13b may be helped by entrainment with the air curtain 35 which will itself be deflected towards cushion portion 13b by the difference in pressures between the cushion portions 13a, 13b. Thus the forces which would be available from the difference in pressures between the portions 13a, 13b to correct the attitude of the vehicle body 10 fall quickly as air flows from portion 13a to portion 13b.

FIGURE 8 is a cross-section through the lower part of a gas cushion vehicle in accordance with the invention. This vehicle is generally similar to the vehicle 10 described in relation to FIGURES 1 to 6 except that the nozzle member 31 is tiltably mounted beneath the vehicle body 11 on a number of cables 38 each of which is attached at one end to the nozzle member 31 and at the other end to the vehicle body 11 on one side of the axis of the port 32 of the nozzle member 31: the cables 38 serve to constrain the nozzle 31 to move only in a substantially predetermined path relative to the vehicle body 11. In the illustrated embodiment, the cables 38 support substantially all of the weight of the nozzle member 31, but it is to be understood that the membranes 33, 34 may also take at least some of the weight of the nozzle member 31 without departing from the invention. As shown in FIGURE 8, when the vehicle body 11 is in its normal cruising attitude relative to the surface 14, the pressures in the cushion portions 13a, 13b are substantially equal and the compartmenting wall 20 is undeflected. The air curtain 35 is discharged from the nozzle member 31 substantially vertically and divides substantially equally between the two cushion portions 13a, 13b.

When the vehicle body 11 tilts relative to the surface 14, as shown in FIGURE 9, the pressure in the left-hand cushion portion 13a rises and that in the right-hand portion 13b falls. The compartmenting wall 20 is deflected towards the lower pressure portion 13b in response to the difference in pressure between the cushion portions 13a, 13b. The cables 38 constrain the nozzle member 31 to tilt in the opposite sense to that in which the compartmenting wall 20 as a whole is turned. In the instance depicted in FIGURE 9 in which the compartmenting wall 20 as a whole is deflected anti-clockwise, the cables 38 constrain the nozzle member 31 to tilt clockwise so that the port 32 discharges its air curtain 35 downwardly and with an inclination towards the higher pressure cushion portion 13a. The curtain 35 thus resists the passage of air from the higher pressure cushion portion 13a to the lower pressure cushion portion 13b and also supplies air to the cushion portion 13a. The pressure in cushion portion 13a thus is maintained or increases, while that in cushion portion 13b falls as air escapes under the right-hand side wall 12, and the attitude correcting forces generated by the difference in pressure between the portions 13a, 13b are maintained or enhanced.

In the embodiments described in relation to FIGURES 8 and 9, it will be appreciated that when there is no cushion in space 13 to support the vehicle body 11, the flexible side wall 12 and the compartmenting means are deflated and crumpled by the weight of the vehicle body resting on them. The cables 38 take up an arbitrary configuration under the body 11.

In embodiments where the side walls 12 are at least partly rigid so that they can support the body 11 from the surface 14, when the vehicle 10 is at rest the cables 38 may be replaced by rigid links pivotally attached to the nozzle 31 and the body 11 without departing from the scope of the invention.

FIGURE 10 is a cross-section through the lower part of another form of gas cushion vehicle in accordance with the invention. This vehicle is similar to the vehicle 10 described in relation to FIGURES 8 and 9 save in the form of the means for regulating the tilting of the nozzle member 31.

The nozzle member 31 is mounted under a bell-like recess 40 formed in the underside of the vehicle body 11 and is pivotable about axis 41. The nozzle member 31 is supplied with air from the duct 19 and a flexible hose 42. The interior of the bell-like recess 40 is sealed off from the cushion space 13 by corrugated flexible seals 43 extending between the body 11 and the nozzle 31 so that there is no communication through the recess 40 between the left-hand and right-hand cushion portions 13a, 13b. Within the recess 40 is mounted a reversible electric motor 44 which acts through a reduction gear train 45 to tilt the nozzle member 31 about the axis 41.

Apertures 46, 47 are provided in the base of the vehicle body 11, respectively opening to the cushion portions 13a, 13b, and the apertures 46, 47 are closed by flexible bellows units 48, 49, whose length varies in response to changes in the pressure of the cushion portion 13a or 13b to which they are exposed. The flexible bellows units 48, 49 comprise actuating members 50, 51 which move contacts (not shown) in respective resistance boxes 52, 53 in accordance with the lengths of the bellows units 48, 49 so as to vary the resistance of the boxes 52, 53. The negative lead of one of the resistance boxes 52, 53 is earthed to the vehicle body 11 and the positive lead of the other of the boxes 52, 53 is also earthed. The other leads are connected to one terminal of the electric motor 44, the other terminal of motor 44 being earthed. The negative terminal of an electric power source (not shown) is connected to one of the boxes 52, 53 and the positive terminal is connected to the other of the boxes 52, 53. Should the pressure of cushion portion 13a increase in relation to that of cushion portion 13b due, for example, to a change in the attitude of the vehicle body 11 relative to the surface 14, the bellows unit 48 will be extended while bellows unit 49 will be contracted. The relative resistances of the resistances boxes 52, 53 change causing an electric current to flow to the motor 44 and the motor 44 drives the gear train 45 causing the nozzle member 31 to be tilted towards the higher pressure cushion portion 13a. The manner of connection of the electric terminals to achieve the tilting of the nozzle member 31 in the correct sense will be apparent to those skilled in the art. FIGURE 11 shows the configuration of the nozzle member 31 and the curtain 35 after the vehicle body 11 has tilted from its desired attitude. It will be noted that the bellows unit 48 is extended while unit 49 is contracted.

It will be apparent to those skilled in the art that the tilting movements of nozzle member 31 of the embodiment of FIGURES 10 and 11 in response to changes in the relative pressures of the cushion portion 13a, 13b could be brought about by hydraulic or pneumatic means instead of the electric motor 44 and the associated resistance boxes 52, 53.

Although the invention has been described in relation to the control of the roll attitude of the vehicle body 11, it is to be understood that the pitch attitude of the vehicle body 11 may also be controlled in a similar manner either alone or in combination with the described manner of roll control without departing from the invention.

I claim:

1. A gas cushion vehicle comprising a body, means for laterally containing at least one cushion of pressurized gas beneath the body for supporting the vehicle, a nozzle member mounted beneath and tiltable relative to the vehicle body, the nozzle member defining a port from which, in operation, a curtain of gas is downwardly directed into the vehicle-supporting gas cushion whereby substantially to divide the gas cushion into two horizontally spaced cushion portions and means operative upon the existence of a difference in pressure between the cushion portions to cause the nozzle member so to tilt that the port will direct the said curtain of gas towards whichever of the cushion portions has the higher pressure.

2. A vehicle according to claim 1 in which the last-named means comprises a substantially air-impermeable wall downwardly depending from the underside of the body, at least part of the wall being deflectable in response to a pressure difference between the cushion portions, the nozzle member being mounted on the said deflectable part of the wall, and constraining means which so constrain the nozzle member that the port will direct the curtain of gas towards the higher pressure cushion portion when the said part of the wall is deflected.

3. A vehicle according to claim 2 in which the constraining means comprise elongated members connected between the body and the nozzle member.

4. A vehicle according to claim 2 in which the underside of the vehicle body defines an aperture and in which the said wall comprises two membranes of flexible sheet material depending by their upper ends from the body on opposite sides of the aperture, the lower ends of the membranes being attached to the nozzle member on corresponding opposite sides of the said port whereby gas may flow between said membranes from the aperture to the port.

5. A vehicle according to claim 4 in which the constraining means comprise elongated members connected between the body and the nozzle member, the elongated members being disposed between the two membranes.

6. A gas cushion vehicle comprising a body, means for laterally containing at least one cushion of pressurized gas beneath the body for supporting the vehicle, a nozzle member pivotally mounted beneath the vehicle body, the nozzle member defining a port from which, in operation, a curtain of gas is downwardly directed into the vehicle-supporting gas cushion whereby substantially to divide the gas cushion into two horizontally spaced cushion portions, means responsive to differences in pressure between the cushion portions to generate signals indicative of said pressure differences, and driving means operatively connected to the nozzle member for so tilting said member in response to signals derived from the pressure-responsive means that the port will direct the said curtain of gas towards whichever of the cushion portions has the higher pressure.

7. A vehicle according to claim 6 in which the pressure-responsive means comprises flexible bellows exposed to each cushion portion, and means for generating a signal in response to changes in the length of the bellows.

References Cited

UNITED STATES PATENTS 3,362,499  1/1968  Tripp _____ 180—121

A. HARRY LEVY, *Primary Examiner.*

U.S. Cl. X.R.

180—121, 128